United States Patent [19]
Nohara et al.

[11] Patent Number: 5,881,154
[45] Date of Patent: Mar. 9, 1999

[54] DATA SCRAMBLE TRANSMISSION SYSTEM

[75] Inventors: Mitsuo Nohara; Katsuyuki Yamazaki, both of Tokyo, Japan

[73] Assignee: Kokusai Denshin Denwa Co., Ltd., Tokyo, Japan

[21] Appl. No.: 976,007

[22] Filed: Nov. 21, 1997

Related U.S. Application Data

[63] Continuation of Ser. No. 584,117, Jan. 11, 1996, abandoned.

[30] Foreign Application Priority Data

Jan. 17, 1995 [JP] Japan ................................. 7-020894

[51] Int. Cl.⁶ .............................. H04L 9/00; H04N 7/167
[52] U.S. Cl. .................................. 380/42; 380/43; 380/9; 380/14; 380/59
[58] Field of Search ................................. 380/9, 14, 36, 380/42, 43, 56, 57, 59

[56] References Cited

U.S. PATENT DOCUMENTS

| | | | |
|---|---|---|---|
| 4,157,453 | 6/1979 | Rosen | 380/36 |
| 5,283,831 | 2/1994 | Cook et al. | 380/48 |
| 5,410,600 | 4/1995 | Toy | 380/9 |
| 5,535,275 | 7/1996 | Sugisaki et al. | 380/10 X |
| 5,600,653 | 2/1997 | Chitre et al. | 370/474 |

OTHER PUBLICATIONS

"Asynchronous Transfer Mode (ATM) Operation Via Satellite: Issues, Challenges and Resolutions" International Journal of Satellite Communications, vol. 12, pp. 211–222, 1994.

"Elementary Cryptography and Cryptanalysis", Donald L. Millikin Aegean Park Press (1943) pp. 37–42.

*Primary Examiner*—Gail O. Hayes
*Assistant Examiner*—Pinchus M. Laufer
*Attorney, Agent, or Firm*—Armstrong, Westerman, Hattori, McLeland & Naughton

[57] ABSTRACT

A data scramble transmission system with a data transmission link coupled between sending and receiving ends is provided. The link adopts transmission frames each of which is constituted by data and control bits periodically added to the data. The system includes a scramble unit located at the sending end, for detecting each of the transmission frames of an input signal stream, for interchanging bit-stream positions of data portion in the detected transmission frame in accordance with a predetermined order to produce interchanged signal stream, and for outputting the interchanged signal stream, and a descramble unit located at the receiving end which receives the interchanged signal stream from the sending end, for detecting each of the transmission frames of the received interchanged signal stream, for reinterchanging bit-stream positions of data portion in the detected transmission frame so as to reconstitute the signal stream inputted into the scramble unit at the sending end, and for outputting the reconstituted signal stream.

8 Claims, 7 Drawing Sheets

DATA SCRAMBLE TRANSMISSION SYSTEM

This application is a continuation of application Ser. No. 08/584,117, filed Jan. 11, 1996, now abandoned.

FIELD OF THE INVENTION

The present invention relates to a data scramble transmission system provided in a communication equipment for digital transmission such as an ATM (Asynchronous Transfer Mode) transmission via satellite links or via microwave terrestrial links.

DESCRIPTION OF THE RELATED ART

In order to prevent absence of clock components or timing information embedded in a transmitted signal and also to prevent transmission of unmodulated wave signals due to the consecutive appearance of "0"s or "1"s, it is necessary to provide data scramble transmission functions in communication equipment for digital transmission via satellite links or via microwave terrestrial links. As for a device performing this data scramble transmission function, a frame-synchronization scramble device and a self-synchronization scramble device are well known.

FIG. 1 shows a conventional frame-synchronization scramble device for INTELSAT Business Service (IBS) defined by the INTELSAT Technical Standard "IESS-309, INTELSAT". In the figure, reference numeral 10 denotes an input data interface, 11 denotes a frame signal generator, 12 denotes an adder, 13 denotes a scramble pattern generator, and 14 denotes a multiplier.

In this scramble device, control frames (unique words), produced separately from signal bit-streams inputted thereto via the data interface 10 by the frame signal generator 11, are added to the input signal bit-streams. The scramble pattern generator 13 produces, based upon a predetermined polynomial and upon an initial data pattern, a random signal pattern in response to the order of the control frames from the generator 11. The output data from the adder 12 is multiplied (scrambled) with the generated signal pattern from the generator 13 at the multiplier 14 so as to randomize an occurrence frequency and an occurrence order of "1"s and "0"s in the transmitted data stream so that the resulting energy of the modulated signal on the satellite link is dispersed.

However, according to this type scramble device, since the control frames (unique words) are added to the input data stream to maintain synchronization between the sending and receiving ends, the transmission rate must be increased on the link between the sending and receiving ends in an amount as much as the amount of the added control frame information.

FIG. 2 shows a conventional self-synchronization scramble device specified in ITU-T Recommendation V. 35 Interface Standard and used for INTELSAT Intermediate Data Rate service (IDR) defined by the INTELSAT Technical Standard "IESS-308, Rev. 6B, Er., No. 1, INTELSAT". In the figure, reference numeral 20 denotes an input data interface, 21 denotes a 20-stage shift register constituting a feedback loop, and 22 denotes a multiplier.

In this scramble device, feedback data provided from a predetermined number of stages of the 20-stage shift register 21 are combined with an input data stream at the multiplier 22. Namely, a plurality of input data are combined with each other to produce random data pattern. Thus, the occurrence frequency and the occurrence order of "1"s and "0"s in the transmitted data stream are randomized and the resulting energy of the modulated signal on the satellite link is dispersed.

However, according to this self-synchronization scramble device, since one input data applied to the shift register 21 is repeatedly used to determine the output data to be transmitted for three times, a one bit transmission error will be amplified into three error bits during the descramble operation in the receiving end.

As described, for example, in D.M. Chitre et al., "ASYNCHRONOUS TRANSFER MODE (ATM) OPERATION VIA SATELLITE: ISSUES, CHALLENGES AND RESOLUTIONS", INTERNATIONAL JOURNAL OF SATELLITE COMMUNICATIONS, VOL. 12, pp. 211–222, 1994, ATM Header Error Check (HEC) function can correct only single-bit errors in an ATM cell header of five bytes (40 bits), but cannot correct burst errors over two bits or more in the header. Thus, the ATM cells having these uncorrectable burst errors in their header will be discarded together with all user information in the payload (384 bits) of these ATM cells.

The single bit correcting ATM HEC can correct most errors encountered over optical fiber links. However, over satellite links or microwave terrestrial links, the probability of occurrence of burst errors or of error amplification for amplifying single bit errors to two or more bit errors as a result of using the conventional self-synchronization scramble device is very high. Thus, the probability of discarding ATM cells over the satellite links or the microwave terrestrial links may be orders of magnitude higher than over the fibers.

SUMMARY OF THE INVENTION

It is therefore an object of the present invention to provide a data scramble transmission system whereby it is not necessary to change the data transmission rate and the transmission format.

Another object of the present invention is to provide a data scramble transmission system which can decrease the probability of discarding ATM cells over the satellite links or the microwave terrestrial links due to burst errors or error amplification.

According to the present invention, a data scramble transmission system with a data transmission link coupled between sending and receiving ends is provided. The link adopts transmission frames each of which is constituted by data and control bits periodically added to the data. The system according to the present invention includes a scramble unit located at the sending end, for detecting each of the transmission frames of an input signal stream, for interchanging bit-stream positions of a data portion in the detected transmission frame in accordance with a predetermined order to produce interchanged signal stream, and for outputting the interchanged signal stream, and a descramble unit located at the receiving end which receives the interchanged signal stream from the sending end, for detecting each of the transmission frames of the received interchanged signal stream, for reinterchanging bit-stream positions of the data portion in the detected transmission frame so as to reconstitute the signal stream inputted into the scramble unit at the sending end, and for outputting the reconstituted signal stream.

The system according to the present invention may include a scramble unit located at the sending end, for detecting each of the transmission frames of an input signal stream, for interchanging bit-stream positions of a data portion in the detected transmission frame in accordance with a predetermined order to produce interchanged signal stream, for multiplying each bit of the interchanged signal stream with each bit of a random signal pattern to produce a scrambled signal stream, and for outputting the scrambled signal stream, and a descramble unit located at the receiving end which receives the scrambled signal stream from the sending end, for multiplying each bit of the received scrambled signal stream with each bit of a random signal pattern to produce a descrambled signal stream, for detecting each of the transmission frames of the descrambled signal stream, for reinterchanging bit-stream positions of the data portion in the detected transmission frame so as to reconstitute the signal stream inputted into the scramble unit at the sending end, and for outputting the reconstituted signal stream.

Since the bit-stream positions of the data portion are interchanged and scrambled, while keeping the data format adopted in the data transmission link, the frame-synchronization scramble will not produce error amplification and the data position interchange can be performed without increasing the transmission rate on the link between the sending and receiving ends. Particularly, according to the present invention, since only the data portion is interchanged (interleaved) into a desired order, all possible burst errors which may occur on the transmission link are outputted at intervals of a predetermined interleaving distance. Thus, the probability of data loss under the error detection control of data link frames which will discard data if concentrated errors occur or under the error cell detection control for the ATM transmission can be effectively decreased. Furthermore, the interleaver pattern can be optionally changed within the number of data in a transmission frame, and therefore the interleaving distance can be optimally selected depending upon the error pattern on the transmission link and upon the requirements for data link control.

It is preferred that the scrambler unit includes a scramble pattern generator for generating a random signal pattern synchronized with the transmission frame, and a multiplier for multiplying bit by bit the interleaved signal stream with the random signal pattern from the scramble pattern generator.

It is also preferred that the descrambler unit includes a descramble pattern generator for generating a random signal pattern synchronized with the transmission frame, and a multiplier for multiplying bit by bit the received scrambled signal stream with the random signal pattern from the descramble pattern generator.

In a preferred embodiment, the scramble unit has a frame detector for detecting each of the transmission frames of the input data stream to output data bits and framing bits in the detected frame, a memory for temporally storing the framing bits, an interleaver for interleaving the data bits in accordance with a predetermined interleaver pattern to produce interleaved data, and a frame combiner for adding the framing bits stored in the memory to the interleaved data to reconstitute the transmission frame. Furthermore, the descramble unit has a frame detector for detecting each of the transmission frames of the received interleaved signal stream to output data bits and framing bits in the detected frame, a memory for temporally storing the framing bits, a deinterleaver for deinterleaving the data bits in accordance with a predetermined deinterleaver pattern to produce deinterleaved data, and a frame combiner for adding the framing bits stored in the memory to the deinterleaved data to reconstitute the transmission frame.

Further objects and advantages of the present invention will be apparent from the following description of the preferred embodiments of the invention as illustrated in the accompanying drawings.

DESCRIPTION OF THE PREFERRED EMBODIMENTS

Figure 1:
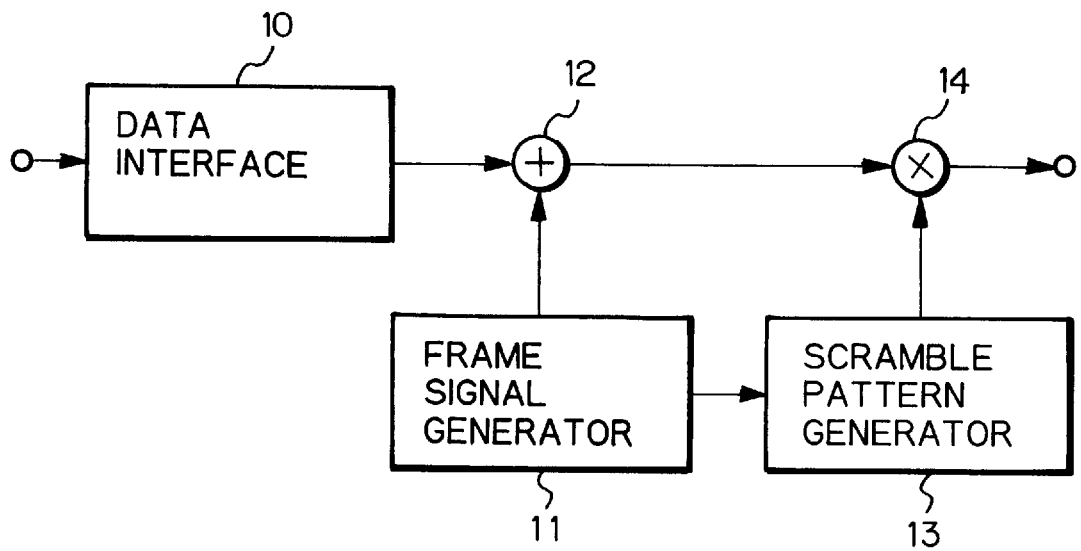
FIG. 1 shows a conventional frame-synchronization scramble device.
Figure 2:
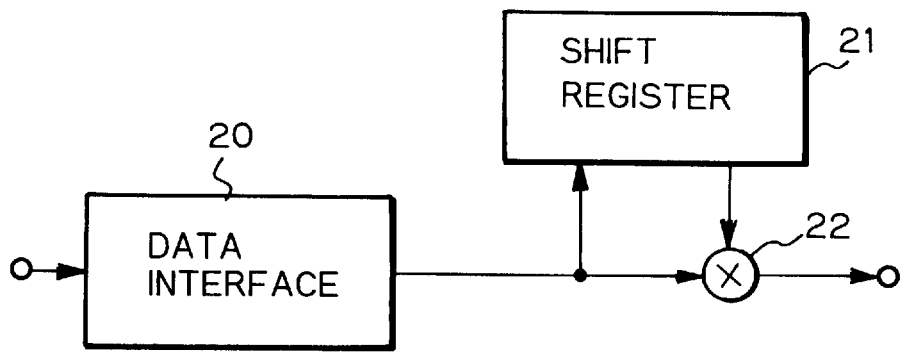
FIG. 2 shows a conventional self-synchronization scramble device.
Figure 3:
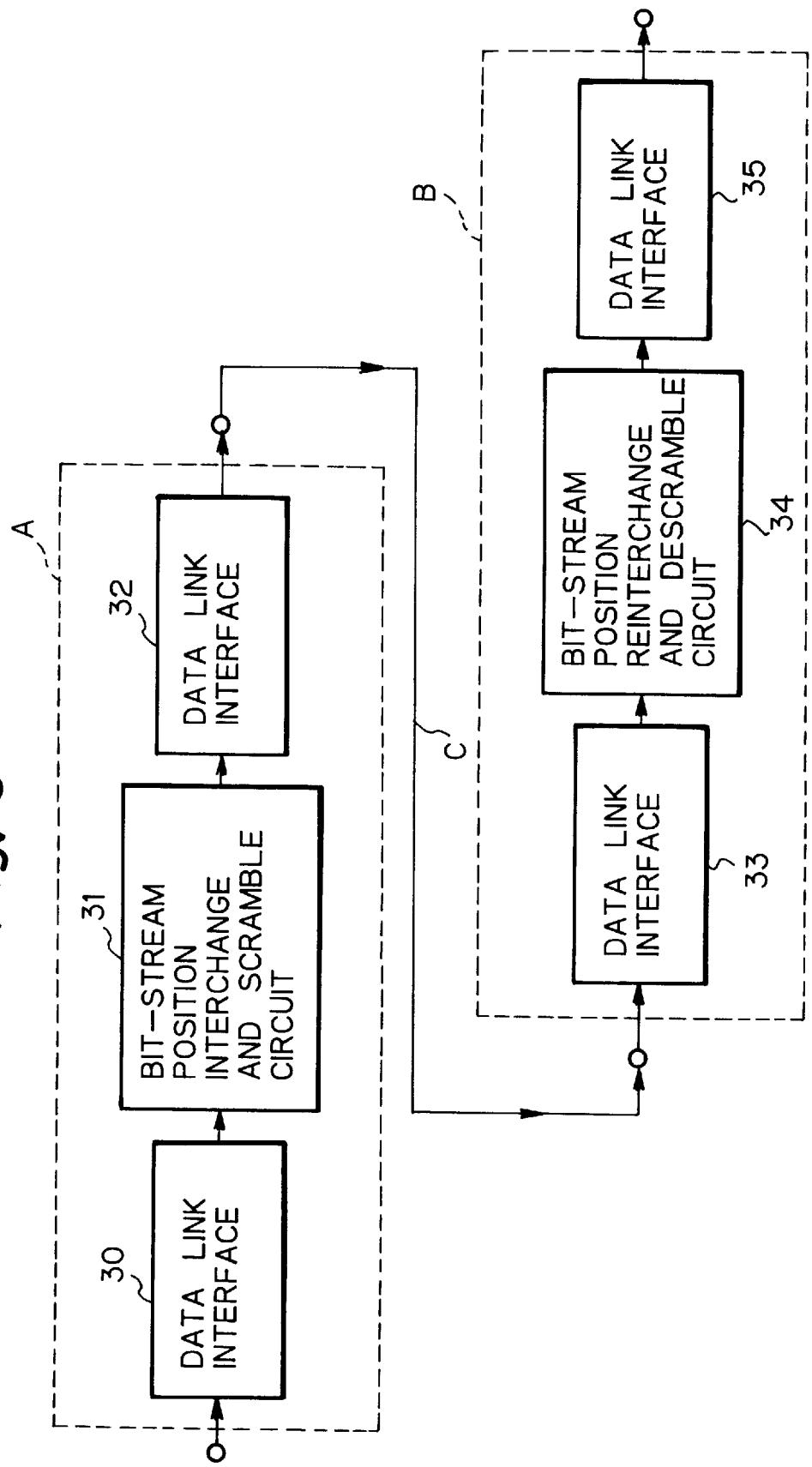
FIG. 3 shows a schematic of a preferred embodiment of a data scramble transmission system according to the present invention.

FIG. 3 schematically shows a data scramble transmission system for ATM transmission via satellite links as a preferred embodiment of according to the present invention. In the figure, reference character A denotes the data scramble unit at the sending end, B denotes the data descramble unit at the receiving end, and C denotes a digital transmission link connecting the sending and receiving ends. Although the present invention is not limited to a specific example, the data transmission link in the following description may be a data link with a data transmission rate of 45 Mbit/s and a data link format of DS-3.

The data scramble unit A includes an input data link interface 30 such as, for example, a DS-3 data interface, a bit-stream position interchange and scramble circuit 31 and an output data link interface 32 such as, for example, a DS-3 data interface. In practice, this output data link interface 32 is coupled to the satellite link C via a Reed-Solomon FEC device, a QPSK modulation device and a RF device (not shown). The data descramble unit B at the receiving end includes an input data link interface 33 such as for example DS-3 data interface, a bit-stream position reinterchange and descramble circuit 34 and an output data link interface 35 such as, for example, a DS-3 data interface. In practice, the input data link interface 33 is coupled to the satellite link C via a Reed-Solomon FEC device, a QPSK modulation device and a RF device (not shown).

In the data scramble unit A at the sending end, each of a plurality of transmission frames of an input data signal stream is detected at the data link interface 30, and then bit-stream positions of data in only a data portion in each transmission frame are interchanged in accordance with predetermined rules and scrambled at the interchange and scramble circuit 31. Thereafter, a transmission frame with the same format as that of the input data signal stream applied to the data link interface 30 is reconstituted at the data link interface 32, and then the data signal with the reconstituted frame is outputted to the link C after known sending processes are performed.

The data from the transmission end via the link C is inputted into the data descramble unit B at the receiving end after known receiving processes are performed. In the data descramble unit B, each of the transmission frames of the input data signal is detected at the data link interface 33, and then, at the reinterchange and descramble circuit 34, bit-stream positions of data in the data portion in each transmission frame are reinterchanged and descrambled contrary to the interchange and scramble operation conducted in the data scramble unit A. Then, a transmission frame with the same format as that of the input data signal applied to the data link interface 33 is reconstituted at the data link interface 35. In FIG. 3, only a one-directional link is illustrated. In case of a bi-directional link, the same one-directional link, but toward the opposite direction, will also be provided.

Figure 4:
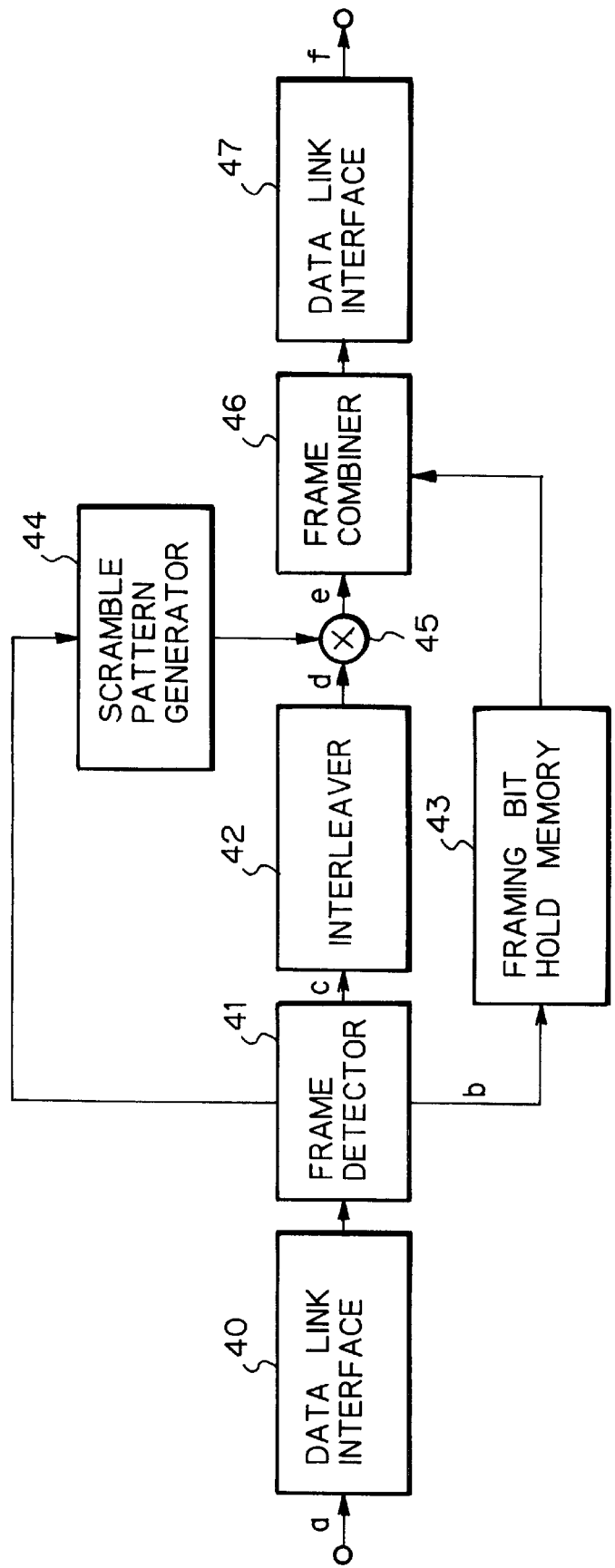
FIG. 4 shows in detail a data scramble unit at a sending end shown in FIG. 3.

FIG. 4 shows in detail the data scramble unit A at the sending end shown in FIG. 3. In the figure, reference numeral 40 denotes an input data link interface, 41 denotes a frame detector, 42 denotes an interleaved, 43 denotes a framing bit hold memory for storing framing bits derived at the frame detector 41, 44 denotes a scramble pattern generator for producing pseudo-random patterns for scramble operation, 45 denotes a multiplier, 46 denotes a frame combiner, and 47 denotes an output data link interface.

Figure 5:
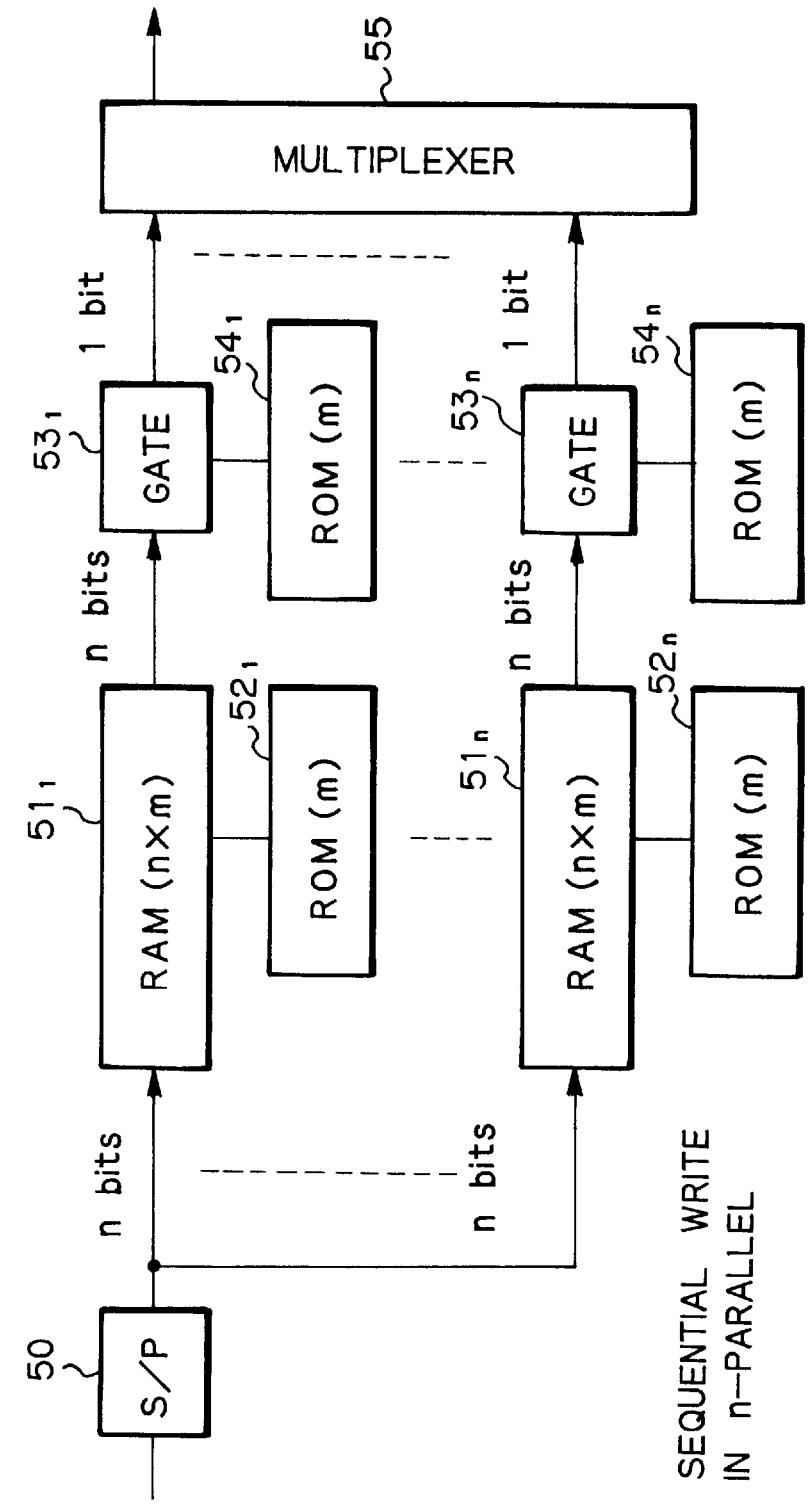
FIG. 5 shows an example of an interleaver shown in FIG. 4.

FIG. 5 shows a circuit example of the interleaver 42 shown in FIG. 4. In the figure, reference numeral 50 denotes a serial/parallel converter for converting input serial data to parallel data of n bits, $51_1$–$51_n$ denote n RAMs each having a capacity of n×m bits, $52_1$–$52_n$ denote n ROMs each having m addresses, for storing interleaving information, $53_1$–$53_n$ denote n gates, $54_1$–$54_n$ denote n ROMs each having m addresses, for storing gate control information, and 55 denotes a multiplexer. If the data transmission rate is 45 Mbit/s, the above-mentioned n and m may be determined to for example n=4 and m=1176.

Hereinafter, the operation of the data scramble unit A shown in FIG. 4 will be described in detail with reference to the time chart of FIG. 6.

At the frame detector 41, each one frame of the input data stream a applied through the input data link interface 40 is detected. In FIG. 6, F indicates framing bits with a specific pattern which makes the detection thereof by the frame detector 41 possible. In the following description, it is considered that the transmission frame unit is constituted by DS-3 M frames recommended in ITU-T G.804. According to this frame constitution, one frame will include data of 4704 bits and control information such as the framing bits of 56 bits.

The framing bits b in the detected frame are fed to the memory 43 and temporally stored therein. Only the data portion c in the detected frame are applied to the interleaver 42 in serial.

In the interleaver 42, the applied serial data with no framing bit is converted into n bits parallel data at the serial/parallel converter 50, and then the same contents of the n bits parallel data are sequentially stored in each of the n RAMs $51_1$–$51_n$. The contents in each of the n RAMs $51_1$–$51_n$ are read out as n bits data by random accessing in response to the interleaving control information stored in the respective ROMs $52_1$–$52_n$. One bit of the read n bits data is selected at each of the gates $53_1$–$53_n$. Then, n one bit data are multiplexed at the multiplexer 55.

Figure 7:
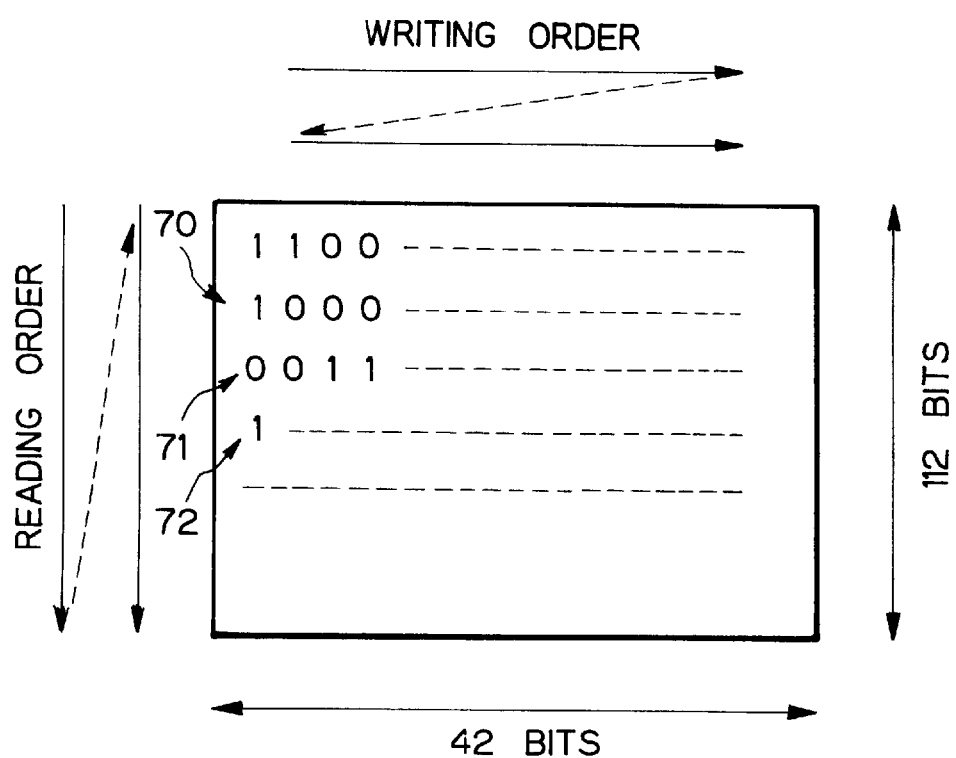
FIG. 7 illustrates an interleaving operation and a deinterleaving operation of the embodiment shown in FIG. 3.

Since data in one frame is formed by 4704 bits in this case, the interleaver pattern is determined to be 42 bits×112 bits as shown in FIG. 7. As will be apparent from this figure, the interleaving operation is performed by writing the data in an order along the horizontal direction shown in the figure and by reading the written data in an order along the vertical direction shown in the figure. In other words, one frame of data is stored in the two-dimensional array with 112 lines and 42 columns so that 42 sequential bits of the input data are written in each of the 112 lines, and then the stored data in each of the 42 columns are sequentially read out.

According to this reading order, two consecutive lines of data are outputted at intervals of 42 bits and also two consecutive lines of data on the link between the sending and receiving ends are outputted at intervals of 42 bits as a result of deinterleaving operation at the receiving end. For example, if a burst error occurs in three consecutive bits 70, 71 and 72 shown in FIG. 7 during the transmission via the satellite link, these bits will be separated by 42 bits with each other when deinterleaving operation is performed. As a result, an ATM cell corresponding to these bits will never be discarded.

Figure 6:
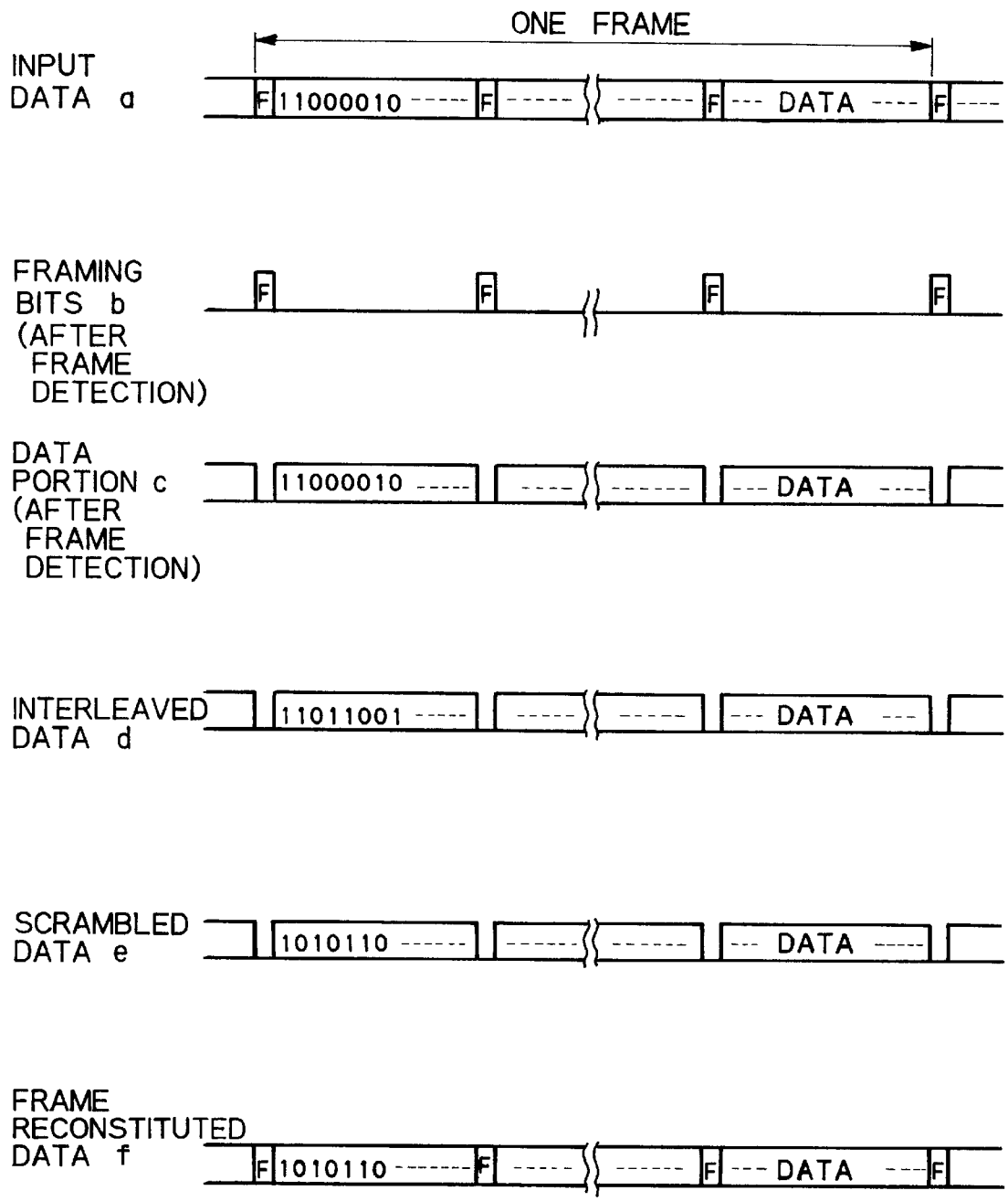
FIG. 6 shows a time chart of various signals in the data scramble unit shown in FIG. 4.

The interleaved (bit-stream position interchanged) data d from the interleaver 42 shown in FIGS. 4 and 6 are then applied to the multiplier 45.

The scramble pattern generator 44 has a known structure for generating random signal pattern based upon a shift register which realizes a predetermined polynomial and upon an initial data pattern. The output signal from this scramble pattern generator 44 is synchronized with the transmission frame and initialized at every transmission frame. This output signal will have a fixed pattern against the order of data bits in the transmission frame. Instead of the aforementioned constitution of sequentially calculating the random pattern, a scramble pattern generator in which data of one-frame length previously calculated are stored in a memory and then the contents in the memory are sequentially read out may be adopted.

At the multiplier 45, the interleaved data d from the interleaver 42 are multiplied bit by bit with the random signal pattern from the scramble pattern generator 44, and thus the scrambled data e are provided to the frame combiner 46. As a result of this scramble operation, the occurrence frequency and the occurrence order of "1"s and "0"s in the transmitted data stream are randomized; thus, causing energy of the modulated signal on the satellite link to disperse and the transmitted power to be smoothed.

Then, at the frame combiner 46, the framing bits b temporally stored in the memory 43 are added to the scrambled data e to reconstitute the transmission frame. The frame reconstituted data f are then outputted via the output data link interface 47 and other known circuits to the transmission link C.

Figure 8:
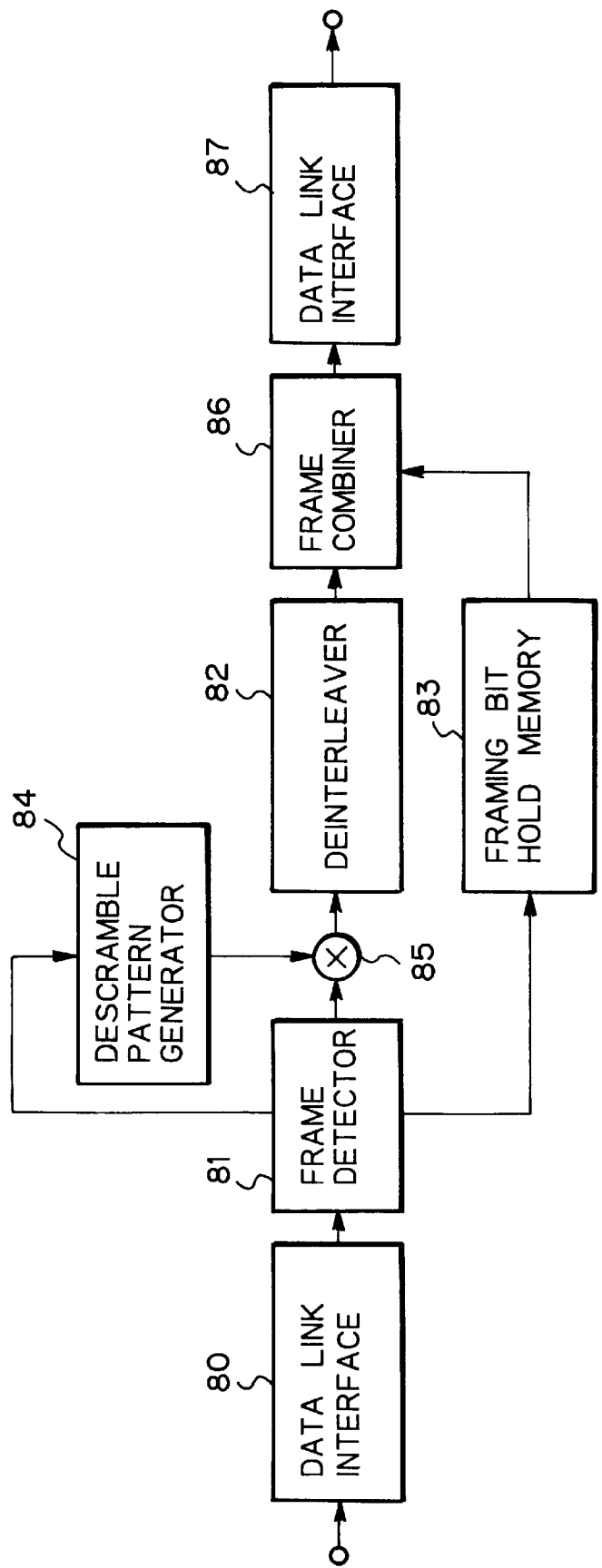
FIG. 8 shows in detail a data descramble unit at a receiving end shown in FIG. 3.

FIG. 8 shows in detail the data descramble unit B at the receiving end shown in FIG. 3. In the figure, reference numeral 80 denotes an input data link interface, 81 denotes a frame detector, 82 denotes a deinterleaver, 83 denotes a framing bit hold memory for storing framing bits derived at the frame detector 81, 84 denotes a descramble pattern generator for producing pseudo-random patterns for descramble operation, 85 denotes a multiplier, 86 denotes a frame combiner, and 87 denotes an output data link interface.

The data descramble unit B descrambles and deinterleaves the received data by performing processes contrary to the interchange and scramble operation in the data scramble unit A to obtain data signal having the original transmission frame.

At the frame detector 81 in this data descramble unit B, each one frame of input data stream a applied through the input data link interface 80 is detected. The framing bits in the detected frames are fed to the memory 83 and temporally stored therein. Only the data portion in the detected frame is applied to the multiplier 85.

The descramble pattern generator 84 has a known structure for generating a random signal pattern corresponding to that from the scramble pattern generator 44 in the sending end. The output signal from this descramble pattern generator 84 is also synchronized with the transmission frame and initialized at every transmission frame.

At the multiplier 85, the data from the frame detector 81 are multiplied bit by bit with the random signal pattern from the descramble pattern generator 84, and thus the original data before scrambling are provided to the deinterleaver 82.

In the deinterleaver 82, the deinterleaving operation is performed by reversing the writing and reading orders illustrated in FIG. 7. Namely, the writing order is along the vertical direction shown in the figure and the reading order is along the horizontal direction shown in the figure to obtain the original data stream.

The deinterleaved (bit-stream position reinterchanged) data from the deinterleaver 82 are then applied to the frame combiner 86. Thus, at the frame combiner 86, the framing bits temporally stored in the memory 83 are added to the deinterleaved data to reconstitute the transmission frame. The frame reconstituted data having the original data stream are then outputted via the output data link interface 87.

As will be understood from the above-description, according to the present invention, since bit-stream position of data are interchanged and scrambled, while keeping the data format used in the data transmission link, the frame-synchronization scramble will not produce error amplification and data position interchange can be performed without increasing the transmission rate between the sending and receiving ends. Particularly, according to the present invention, since only the data portion is interleaved to a desired order, all possible burst errors which may occur on the transmission link are outputted at intervals of a predetermined interleaving distance. Thus, the probability of data loss under the error detection control of data link frames, which will discard data if concentrated errors occur, or under the error cell detection control for the ATM transmission can be effectively decreased. Furthermore, the interleaver pattern can be optionally changed within the number of data in a transmission frame, and therefore the interleaving distance can be optimally selected depending upon the error pattern on the transmission link and upon requirement for data link control.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data scramble transmission system with a data transmission link coupled between sending and receiving ends, said link adopting transmission frames each of which is constituted by serial data and control bits periodically added to the data, said system comprising:

a scramble unit located at the sending end, for detecting each of the transmission frames of an input signal stream in which the serial data and control bits are sequentially organized into rows of a predetermined bit length forming a two-dimensional structure, for interchanging bit-stream positions of data portion in the detected transmission frame to produce an interchanged signal stream by vertically reading each bit, by columns, from the two-dimensional structure to separate each originally sequential bit by the predetermined bit length of the rows, and for outputting the interchanged signal stream; and a descramble unit located at the receiving end which receives the interchanged signal stream from the sending end, for detecting each of the transmission frames of the received interchanged signal stream, for reinterchanging bit-stream positions of data portion in the detected transmission frame so as to reconstitute the signal stream inputted into said scramble unit at the sending end, and for outputting the reconstituted signal stream.

2. The system as claimed in claim 1, wherein said scramble unit comprising a frame detector for detecting each of the transmission frames of the input data stream to output data bits and framing bits in the detected frame, a memory for temporarily storing the framing bits, an interleaver for interleaving the data bits in accordance with a predetermined interleaver pattern to produce interleaved data, and a frame combiner for adding the framing bits stored in said memory to the interleaved data to reconstitute the transmission frame.

3. The system as claimed in claim 1, wherein said descramble unit comprising a frame detector for detecting each of the transmission frames of the received interchanged signal stream to output data bits and framing bits in the detected frame, a memory for temporarily storing the framing bits, a deinterleaver for deinterleaving the data bits in accordance with a predetermined deinterleaver pattern to produce deinterleaved data, and a frame combiner for adding the framing bits stored in said memory to the deinterleaved data to reconstitute the transmission frame.

4. A data scramble transmission system with a data transmission link coupled between sending and receiving ends, said link adopting transmission frames each of which is constituted by serial data and control bits periodically added to the data, said system comprising:

a scramble unit located at the sending end, for detecting each of the transmission frames of an input signal stream in which the serial data and control bits are sequentially organized into rows of a predetermined bit length forming a two-dimensional structure, for interchanging bit-stream positions of data portion in the detected transmission frame to produce an interchanged signal stream by vertically reading each bit, by columns, from the two-dimensional structure to separate each originally sequential bit by the predetermined bit length of the rows, for scrambling the interchanged signal stream to produce a scrambled signal stream, and for outputting the scrambled signal stream; and a descramble unit located at the receiving end which receives the scrambled signal stream from the sending end, for descrambling the received scrambled signal stream to produce descrambled signal stream, for detecting each of the transmission frames of the descrambled signal stream, for reinterchanging bit-stream positions of data portion in the detected transmission frame so as to reconstitute the signal stream inputting into said scramble unit at the sending end, and for outputting the reconstituted signal stream.

5. The system as claimed in claim 4, wherein said scrambler unit includes a scramble pattern generator for generating a random signal pattern synchronized with the transmission frame, and a scrambler for combining bit by bit the interchanged signal stream with the random signal pattern from the scramble pattern generator.

6. The system as claimed in claim 4, wherein said descrambler unit includes a descramble pattern generator for generating a random signal pattern synchronized with the transmission frame, and a descrambler for combining bit by bit the received scrambled signal stream with the random signal pattern from the descramble pattern generator.

7. The system as claimed in claim 4, wherein said scramble unit comprising a frame detector for detecting each of the transmission frames of the input data stream to output data bits and framing bits in the detected frame, a memory for temporarily storing the framing bits, an interleaver for interleaving the data bits in accordance with a predetermined interleaver pattern to produce interleaved data, and a frame combiner for adding the framing bits stored in said memory to the interleaved data to reconstitute the transmission frame.

8. The system as claimed in claim 4, wherein said descramble unit comprising a frame detector for detecting each of the transmission frames of the received interchanged signal stream to output data bits and framing bits in the detected frame, a memory for temporarily storing the framing bits, a deinterleaver for deinterleaving the data bits in accordance with a predetermined deinterleaver pattern to produce deinterleaved data, and a frame combiner for adding the framing bits stored in said memory to the deinterleaved data to reconstitute the transmission frame.

\* \* \* \* \*